Patented Nov. 12, 1940

2,221,410

UNITED STATES PATENT OFFICE 2,221,410

RECOVERY OR PRODUCTION OF UNITARY CYCLIC COMPOUNDS

Mathias Pier, Heidelberg, Germany, assignor to I. G. Farbenindustrie Aktiengesellschaft, Frankfort-on-the-Main, Germany No Drawing. Application February 23, 1938, Serial No. 191,972. In Germany February 27, 1937

11 Claims. (Cl. 260—668)

The present invention relates to the recovery or production of unitary cyclic compounds, especially such as are polynuclear, and more particularly to improved methods of recovering or producing such compounds from extracts obtained by means of solvents, preferably under pressure, from solid carbonaceous materials, as for example mineral or brown coals.

In the extracts of coals and other solid carbonaceous substances there are contained or preformed numerous cyclic compounds, which are usually valuable and which can only be separated therefrom with difficulty in a direct manner. It has therefore been suggested first to subject the extracts to a destructive hydrogenation and only then to separate the cyclic compounds.

I have now found that compounds of the said kind can be recovered in a simple manner by subjecting the extracts or fractions thereof to a thermal splitting without causing appreciable hydogenation, the compounds to be recovered then being separated by physical or chemical methods from the substances or fractions thereof thus obtained.

In order to carry out the process, the solid carbonaceous substances, as for example coals, peat, shales or hard pitch are first subjected to extraction, preferably under pressure, in the customary manner. For this purpose the initial materials are comminuted, preferably ground finely, and mixed with a solvent which is used for example in an equal amount or in double the amount or in a multiple of the amount. As solvents there may be mentioned middle oils or heavy oils or fractions of the same (oils allied to the substance to be extracted being preferably used, as for example oils obtained from coal being preferably used for the treatment of coal) and also phenols or fractions containing phenols, wholly or partially hydrogenated naphthalene, anthracene, phenanthrene or other polynuclear compounds. Mixtures of two or more solvents, of which one may be a substance giving off hydrogen for example, may also be used. The mixture is then heated to temperatures of from 200° to 500° C., advantageously from 300° to 450° C. As a rule increased pressure is used and this may be produced for example by the vapours of the solvent or also by gases. It is advantageous to use pressures of more than 20 atmospheres, in particular of more than 50 atmospheres, as for example of from 100 to 1000 atmospheres. The temperature or pressure or both may be increased continuously or in stages. The extraction may also be carried out in the presence of small amounts of hydrogen.

It is of advantage for the initial materials to be subjected to a pretreatment before the extraction. For example the ashes contained therein may be neutralized by impregnating the initial materials with small amounts of dilute acids, such as for example hydrochloric acid, sulphuric acid, nitric acid or organic acids, as for example acetic acid or sulphonic acids, or also by washing the initial materials with larger amounts of acid. The extraction may also be assisted by a pretreatment of the initial materials with gases or vapours, such as for example nitric oxide, oxygen, halogen or hydrogen halide, or also by a heating, if desired under pressure, or by the addition of a substance having a catalytic action. For example the initial materials may be sprayed with a solution of a catalytically active substance, as for example a solution of metal salts in water or organic solvents. As such catalysts there may be mentioned especially the compounds of metals of the 4th to the 8th groups of the periodic system, as for example their oxides, sulphides, sulphates, sulphonic salts, halides, phosphates and sulphites. The catalytically active substances may also be added in the form of metals or their compounds in a finely divided state, if desired arranged on carriers, in an amount of from 0.1 to 10 per cent, advantageously of from 0.5 to 5 per cent. Two or more of the said pretreatments may also be used.

The extracts obtained are then subjected to a thermal splitting. As a rule, this treatment is carried out at temperatures of from 450° to 500° C. or more, as for example at from 550° to 750° C., and if desired under increased pressure, as for example at from 20 to 300 atmospheres or more. The thermal splitting may also be carried out in the presence of gases or vapours, such as for example steam, hydrogen, nitrogen or oxides of carbon, but the use of hydrogen or gases giving off hydrogen should not take place under conditions which lead to appreciable hydrogenation. At atmospheric pressure hydrogen may usually be employed without limit; when working under pressure a hydrogen partial pressure of less than 10 atmospheres should usually be maintained, though when working at elevated temperatures above about 550° C., hydrogen partial pressures of up to from about 20 to 50 atmospheres may be used. The extracts may also be subjected to the thermal splitting together with a mineral or tar oil which is to be split, for example in the known cracking apparatus. Low temperature carbonization retorts may also be used for the splitting of the extracts.

When the extraction is carried out without catalytically acting additional substances, it is advisable to carry out the thermal splitting in the presence of catalysts, as for example metals of the 4th to the 8th groups of the periodic system or their compounds, in particular their oxides, halides, phosphates or sulphides, or substances containing silicon, as for example bleaching earths, or active carbon, which have advantageously been pretreated with acids, as for example hydrogen fluoride, or gases, or also halogen, hydrogen halides, metal halides or phosphorous compounds, or mixtures of the said catalytically acting agents. It is, however, also advantageous to add catalysts when the extraction has already been carried out in the presence of catalytically active substances and the extracts still contain the same.

It is also preferable to split the extract up into fractions before the thermal splitting. This may be effected by treatment with solvents, as for example benzine or benzene hydrocarbons, liquid sulphur dioxide, phenols, liquid ammonia, aniline, nitrobenzene, furfurol, phenylhydrazine, glycol derivatives, fumaric acid, keto-acids or liquefied normally gaseous hydrocarbons, such as propane, ethane or butane or mixtures of the same, or mixtures of the liquefied normally gaseous hydrocarbons with any of the said previously mentioned solvents. The splitting up into fractions of the extracts may also sometimes be effected by a distillation, in particular under reduced pressure. The thermal splitting of the fractions is then carried out under the conditions most suitable for the purpose. In this way cyclic compounds can be obtained which could not be recovered from the product arising from the thermal splitting of the whole extract.

Before the thermal splitting, the extracts or their fractions may be subjected to a dehydrogenation. This may be carried out for example at from 400° to 700° C., advantageously at from 400° to 600° C., preferably in the presence of catalysts. As catalysts there may be mentioned the metals and metal compounds known for this purpose. Gases and vapours, as for example steam, hydrogen, nitrogen, carbon monoxide, carbon dioxide or methane may also be added. The period during which the reactants are within the reaction chamber is so selected that only a light dehydrogenation takes place and that the thermal splitting proper does not take place until the following thermal treatment, during which for example the materials remain for a longer period within the reaction chamber. The dehydrogenation and thermal splitting are preferably carried out in one operation, the apparatus being so constructed that in the first part there occurs merely a splitting off of hydrogen, the thermal splitting proper then taking place in the further parts of the apparatus.

The dehydrogenation may also be carried out in other ways, as for example by leading the material to be treated over copper at 350° C. with the addition of a limited amount of air or oxygen, or by heating it with sulphur or the like, for example at from 150° to 300° C. Agents which bind hydrogen, such as selenium, tellurium, oxides of nitrogen or dilute nitric acid may also be used. The dehydrogenation may also be effected by treatment with halogen directly or by halogenation and splitting off of hydrogen halide, if desired while adding catalysts. These methods of working have the advantage that comparatively low temperatures and short durations within the reaction chamber can be used.

The products obtained by the thermal splitting contain the compounds to be recovered, in so far as they are of high molecular weight, in a readily crystallizable form. They may be recovered for example by the methods usual in the working up of tar, as for example by fractional crystallization, which is if necessary facilitated by previous or intermediate distillation, or by the use of solvents or by chemical methods based upon specific reactions of the single bodies to be recovered, as for example by potash fusion, sulphonation or the like.

If the thermally split products contain portions of lower boiling point, cyclic compounds of lower boiling point may be recovered therefrom in many cases.

When the extracts are subjected to a dehydrogenation before the thermal splitting, the unitary cyclic compounds may in many cases also be removed from the dehydrogenation product in the manner described above, the dehydrogenation product which has been wholly or partly freed from cyclic compounds being then thermally split.

The dehydrogenation or the thermal splitting or both may also be carried out two or more times, the compounds to be recovered being separated after one or more stages or after each stage.

Before the separation of the unitary bodies it is advisable to free the products resulting from the dehydrogenation or thermal splitting from polymerization products and substances tending to polymerize. This may be effected by treatment with a solvent, as for example with hot alcohol or a mixture of alcohol and benzene, toluene or xylene, or ketones, such as acetone, or halogenated hydrocarbons, such as chloroform or ethylene chloride, in the presence of adsorption agents, such as fuller's earth, bleaching earths or active carbon. The refining may also be carried out with acids, such as sulphuric acid or chlorsulphonic acid, or condensing salts, such as iron chloride, aluminum chloride, or zinc chloride. Bodies having unitary boiling or melting point may be recovered from the mass thus purified by fractional distillation, cooling in stages, by the use of selective solvents or by dissolution and precipitation.

If the refining is effected with adsorption agents, the substances taken up by the adsorption agents may be separated from the solid refining agent with the aid of a solvent, such as carbon disulphide, carbon tetrachloride or trichlorethylene. After removing the solvent, valuable resins are obtained which may be used as such as synthetic resins, insulating masses or the like or may be added to natural or synthetic resins.

Before working up the extracts it has been found to be preferable to remove therefrom the paraffin wax or similar constituents. This may be effected for example by treatment with solvents and cooling or, in the case of brown coal extracts, by purely mechanical means, such as sedimentation, centrifuging, filtration or cooling.

Unitary cyclic compounds can also be obtained in a specially simple manner and in good yields by splitting up the extracts of solid carbonaceous substances with the aid of selective solvents into a fraction rich in hydrogen and a fraction poor in hydrogen, subjecting the fraction poor in hydrogen to a destructive hydrogenation and/or a dehydrogenation and separating the compounds to be recovered from the resulting substances or their fractions by physical or chemical means.

For this purpose, the extracts obtained in the manner described above are split up with the aid of selective solvents into fractions rich in hydrogen and poor in hydrogen. For this treatment, two groups of solvents are suitable. One group has the property of dissolving the constituents poor in hydrogen, as for example the aromatic compounds. To this group there belong for example liquid sulphur dioxide, aniline, methylaniline, toluidine, furfurol, acetonitrile, dichlorethyl ether, triethylene glycol, phenyl hydrazine and keto-acids. The other group of selective solvents have the property of precipitating high molecular weight fractions poor in hydrogen, as for example asphalt or resinous substances. To this group there belong in particular low boiling hydrocarbons of the methane series, as for example ethane, propane, pentane, hexane or mixtures of the same, as for example benzines of low boiling point. It is frequently advantageous to use mixtures of solvents of both groups, as for example a mixture of liquefied propane and sulphur dioxide. By treatment with these solvents two layers are formed which are separated from one another.

For the further treatment of the fractions poor in hydrogen, a destructive hydrogenation may be used for example. This is carried out in known manner under such conditions that in all cases a considerable enrichment in hydrogen takes place, in addition to which a more or less considerable splitting or rearrangement of the hydrocarbon molecule may simultaneously take place. It is preferable to work at comparatively high temperatures, as for example above 450° C., and if necessary with comparatively small amounts of hydrogen. The destructive hydrogenation is carried out in the presence of the catalysts known for the purpose.

If it is desired to work up the fraction poor in hydrogen of the extracts by dehydrogenation, this may be carried out by heating to temperatures of from about 400° to 700° C. or more, in particular between 400° and 600° C. Such a dehydrogenation is preferably carried out in the presence of catalysts, in particular those which are finely divided. For this purpose there may be mentioned for example magnesium, zinc, aluminum, silicon, titanium, tin, vanadium, chromium, molybdenum, tungsten, uranium, manganese, iron, nickel, cobalt or rare earths, preferably in the form of their compounds or as mixtures. These catalysts may be arranged on carriers, such as active carbon, as for example activated granular lignite coke, which has advantageously been treated with acid, or active silica, bleaching earths which have preferably been exposed to a treatment with hydrogen fluoride, and the like. The dehydrogenation may also be carried out in the presence of hydrogen, as for example under a pressure of from 5 to 200 atmospheres or more. It is advantageous to use a hydrogen partial pressure below 50 atmospheres with a total pressure of about 200 atmospheres. Other gases or vapours, such as steam, nitrogen, oxides of carbon or methane, or gas mixtures, such as watergas, may also be added. In dehydrogenations in the presence of hydrogen, the oxides or sulphides of the metals of the 5th and 6th groups of the periodic system, if desired in admixture with other metal compounds, have proved valuable as catalysts.

The dehydrogenation may also be carried out in stages, as for example with increasing temperature or with catalysts of increasing dehydrogenating action, for example by first carrying out the dehydrogenation at moderately elevated temperature, as for example from 350° to 500° C., preferably in the presence of catalysts, such as vanadium, chromium, silicon, molybdenum, tungsten or nickel, in particular their compounds, the resulting products or fractions of the same being then treated with aluminum chloride, boron fluoride, iron chloride, or titanium chloride, if desired with an addition of hydrochloric acid, at temperatures of from 50° to 300° C., advantageously from 80° to 200° C.

The dehydrogenation may also be carried out in the presence of metals of the platinum group. The dehydrogenation may also be effected in other ways, as for example by leading the material over copper at 350° C. while adding a measured amount of air or oxygen, or by heating with sulphur and the like, for example at from 150° to 300° C. Other agents which bind hydrogen, such as selenium, tellurium, oxides of nitrogen or dilute nitric acid, may also be used. The dehydrogenation may also be effected by treatment with halogen directly or by halogenation and splitting off of hydrogen halides, if necessary with an addition of catalysts. These methods of working have the advantage that comparatively low temperatures and short periods in the reaction chamber can be used. In some cases a splitting off of side chains may take place in addition to the dehydrogenation.

In many cases it is advantageous to subject the fraction of the extract poor in hydrogen to a destructive hydrogenation, in particular at comparatively low temperatures as for example between 300° and 480° C., and only then to subject it to a dehydrogenation. The dehydrogenation products, regardless of whether they have been obtained directly from the fraction of the extract poor in hydrogen or only after a destructive hydrogenation of the same, may also be subjected to a destructive hydrogenation which is preferably carried out with small amounts of hydrogen.

From the resulting products, the cyclic compounds to be recovered may be separated by chemical or physical methods in a simple manner. For example aromatic compounds of lower boiling point can be obtained by fractional distillation and substances of higher molecular weight by the methods usual in the working up of tar, as for example by fractional crystallization which may be facilitated if necessary by previous or intermediate distillation, or by the use of suitable solvents or also by chemical methods based on specific reactions of the single substances to be recovered, as for example potash fusion or sulphonation. When the cyclic compounds crystallize out, they may be separated from the oil by centrifuging or filtration at moderately elevated, ordinary or reduced temperature, if desired with the addition of a diluent. They may be purified by recrystallization from suitable solvents or by dissolution and precipitation. The procedure may also be that from fractions of extensive boiling range, several cyclic compounds are separated together, these then being separated from each other for example by fractional crystallization or treatment with selective solvents or by dissolution and precipitation in stages with the same or different precipitants.

For example if the fraction poor in hydrogen of an extract obtained from mineral coal be subjected to a dehydrogenation and the product thus obtained be fractionated, anthracene together with its accompanying substance phenanthrene (which passes over mainly between 325° and 345° C.) can be obtained from the fraction boiling from 300° to 400° C., fluorene can be obtained from the fractions boiling from 295° to 320° C., and pyrene and chrysene from those boiling above 390° C. The last two substances may be separated from each other with the aid of carbon disulphide.

The fraction rich in hydrogen obtained by the treatment of the extracts with selective solvents may be further worked up in any desired manner. For example it may be converted into lubricating oil by a mild destructive hydrogenation. For example temperatures of from about 350° to 450° C., may be used and the remainder of the working conditions, in particular the pressure, the nature of the catalyst and the throughput through the reaction vessel, may be chosen so that a splitting of the initial materials is avoided as far as possible. The destructive hydrogenation may, however, also be carried out under stronger conditions, whereby a more or less considerable splitting takes place, as for example at temperatures between about 400° and 500° C., there being obtained in this way good Diesel oils having a high cetene value or good illuminating oils or good benzines or two or more of these products. If desired the fraction rich in hydrogen may also be subjected to a thermal splitting in the absence of hydrogen, preferably under increased pressure and in the presence of catalysts. The fractions of the nature of Diesel oils arising from such a thermal splitting and destructive hydrogenation may also be further split up, as for example by destructive hydrogenation under conditions under which so-called aromatization takes place, in particular at temperatures of from about 450° to 550° C. or more. The fraction rich in hydrogen may, however, also be subjected to the process described in the earlier part of this specification, further amounts of unitary cyclic compounds thereby being obtained therefrom.

The following examples will further illustrate the nature of this invention but the invention is not restricted to these examples.

Example 1

An extract obtained from mineral coal is subjected to low temperature carbonization by heating in a retort at 600° C. The vapours formed are then led at 600° C. over a dehydrogenation catalyst consisting of active carbon on which molybdenum and cobalt sulphides are precipitated. The resulting product is fractionally distilled. The fractions up to 180° C. consist to a great extent of benzene, toluene and higher homologues. From the fractions of higher boiling point, solid aromatic hydrocarbons are recovered by crystallization.

Example 2

Mineral coal is extracted with middle oil under a pressure of 150 atmospheres at 420° C. in the presence of hydrogen. The extract obtained, after filtering off the ashes, is cracked together with the middle oil at 15 atmospheres pressure in such manner that coke is formed as residue. The cracked product is fractionated.

The benzine obtained consists to a great extent of aromatic hydrocarbons and the middle oil serves for making into a paste and extracting fresh batches of coal. The fractions of higher boiling point are heated for 2 hours at 300° C. with 20 per cent of flowers of sulphur and thus dehydrogenated. From the dehydrogenation product of the fraction boiling from 230° to 380° C. under a pressure of 50 millimeters (mercury gauge) pyrene is isolated by crystallization.

Example 3

Brown coal is subjected in known manner to an extraction with tetrahydronaphthalene. The extract is freed from solvent and then treated at 50° C., with three times its amount of a benzine fraction boiling between 70° and 100° C. The layers formed are separated from each other by centrifuging. The fraction rich in hydrogen dissolved in the benzine (about 32 per cent of the extract) is freed from benzine by distillation and let at a temperature of 380° C. under a pressure of 250 atmospheres together with hydrogen over tungsten sulphide. The reaction product contains 4 per cent of benzine, 25 per cent of gas oil, 32 per cent of paraffin wax and 39 per cent of lubricating oil.

The fraction poor in hydrogen of the extract, which contains asphalt, is subjected to a destructive hydrogenation at a temperature of 470° C. under a pressure of 250 atmospheres in the presence of molybdenum which has been applied to granular lignite coke. The destructive hydrogenation product obtained is distilled and split up into fractions. These are then dehydrogenated and the desired compounds separated therefrom. For example the fractions boiling from 340° to 420° C. are heated for 2 hours at 300° C. with 20 per cent of flowers of sulphur. From the dehydrogenation product there separate pyrene, methylated pyrenes, chrysene and anthracene.

What I claim is:

1. The process of recovering solid cyclic compounds from solid carbonaceous materials which comprises subjecting said material to extraction with a solvent, comprising an aromatic compound, and selected from the group consisting of middle and heavy oils, phenols, hydrogenated naphthalenes, hydrogenated anthracenes and hydrogenated phenanthrenes, at a temperature of 200 to 500° C. and a pressure in excess of 20 atmospheres, separating the extract, subjecting the extract to a splitting at a temperature of 450 to 750° C. and a pressure in excess of 200 atmospheres, without causing appreciable hydrogenation, and isolating said solid cyclic compounds from the reaction product.

2. The process as defined in claim 1 wherein the partial pressure of hydrogen when hydrogen is present does not exceed 10 atmospheres when the temperature is below 550° C. and said pressure is from about 20 to 50 atmospheres when the temperature exceeds 550° C., and wherein said solid cyclic compounds are isolated by crystallization.

3. The process as defined in claim 1 wherein a dehydrogenation is interpolated between the extraction and splitting steps, said dehydrogenation being effected at a temperature ranging from 150 to 700° C., in the presence of a dehydrogenating agent, said agent being selected from the class consisting of sulphur, selenium and tellurium when the temperature ranges from 150 to 300° C.

4. The process of recovering uniform polynuclear carbon compounds containing at least 3 rings from solid carbonaceous materials which comprises subjecting said materials to a solvent extraction with a cyclic compound at a temperature of from 200 to 500° C. under elevated pressure, separating the extract, subjecting the extract to a treatment at a temperature of 450 to 750° C. to effect thermal splitting without appreciable hydrogenation and the production of products containing substantial and recoverable amounts of said polynuclear compounds and isolating said compounds from the reaction product.

5. The process as defined in claim 4 wherein said solid carbonaceous material is a coal.

6. The process as defined in claim 4 wherein a dehydrogenation of the extract is interpolated between the extraction and thermal splitting steps.

7. The process as defined in claim 4 wherein a dehydrogenation of the extract is interpolated between the extraction and splitting steps, said dehydrogenation being effected at a temperature ranging from 150 to 700° C. in the presence of a dehydrogenation catalyst.

8. The process as defined in claim 4 wherein a dehydrogenation of the extract is interpolated between the extraction and splitting steps, said dehydrogenation being effected at a temperature ranging from 400 to 700° C. in the presence of a dehydrogenation catalyst.

9. The process as defined in claim 4 wherein the extract prior to thermal splitting is split-up by means of a selective solvent into a part rich in hydrogen and a part poor in hydrogen and wherein the latter is subjected to said thermal splitting.

10. The process as defined in claim 4 wherein paraffin waxes, polymers and substances capable of polymerization are removed from the extract prior to the thermal splitting of the extract.

11. The process as defined in claim 4 wherein said polynuclear compounds are isolated by fractional crystallization.

MATHIAS PIER.